United States Patent

Lantz et al.

[11] Patent Number: 6,055,884
[45] Date of Patent: May 2, 2000

[54] AUTOMOBILE CONNECTING ROD

[75] Inventors: Kenneth A. Lantz, Lewis Center; Jason L. Toffolo, Powell, both of Ohio

[73] Assignee: Honda Giken Kogyo Kabushiki Kaisha, Tokyo, Japan

[21] Appl. No.: 09/184,643

[22] Filed: Nov. 3, 1998

[51] Int. Cl.[7] .................................................. F02B 75/32
[52] U.S. Cl. .................. 74/579 E; 74/579 R; 123/197.3; 384/255; 384/294
[58] Field of Search .............................. 74/579 R, 579 E; 29/888.09; 123/197.3; 384/255, 294

[56] References Cited

U.S. PATENT DOCUMENTS

| | | | |
|---|---|---|---|
| 1,831,325 | 11/1931 | Short | 74/579 E X |
| 2,053,962 | 9/1936 | Lonas et al. | |
| 4,422,348 | 12/1983 | Campbell | 74/579 E |
| 5,109,605 | 5/1992 | Hoag et al. | |
| 5,507,093 | 4/1996 | Wittenstein et al. | |
| 5,536,089 | 7/1996 | Weber et al. | |
| 5,594,187 | 1/1997 | Lynn | |

OTHER PUBLICATIONS

Photographs of BMW connecting rods juxtaposed with written description from Jul. 1992 issue of *Automotive Industries* magazine.

Photographs of Neon connecting rods juxtaposed with written description from a magazine, available for public sale since Fall 1994.

*Primary Examiner*—Allan D. Herrmann
*Attorney, Agent, or Firm*—Morgan & Finnegan, L.L.P.

[57] ABSTRACT

A light-weight bearing cap for attaching a connecting rod to a journal of a crankshaft pin has two longitudinally extending shoulders separated by an arcuate span conforming to the shape of the journal The shoulders are adapted to receive fasteners which connect mating surfaces of the connecting rod to those of the bearing cap. Mass is conserved by ensuring that the inner and outer arcuate surfaces are shaped as arcs of non-concentric circles such that the maximum thickness of the span occurs at the bisecting points of the respective arcs and the minimum thickness of the span occurs in the region between the shoulders and the maximum thickness. The thickness where the machined surface on the shoulder is located is greater than in the region between the shoulder and the region of maximum thickness.

24 Claims, 4 Drawing Sheets

AUTOMOBILE CONNECTING ROD

BACKGROUND OF THE INVENTION

1. Field of the Invention

The present invention relates generally to the field of connecting rods and their bearing caps which transfer the pressure of combustion from reciprocating pistons to the rotary motion of the crank shaft and, more particularly, to connecting rods and their bearing caps which have been obtained by forging the rod and the cap as a single piece from a powder metal sintered preform and then separating them by cracking the cap from the rod.

2. Description of the Related Art

Connecting rods connect the reciprocating piston to the rotating crankshaft. The connecting rod assembly must be sturdy and complex to bear the load of combustion while undergoing the reciprocating and rotary motions. The assembly layout has three basic parts, a small end for connection to the piston, a big end for connection to the crankshaft and a beam connecting the ends. The small end has a cylindrical hole which receives a steel pin ("wrist" pin). The wrist pin is mounted in the opposed sides of the piston skirt. The wrist pin allows the rod to transfer the reciprocating motion of the piston to the rotary motion of the crankshaft.

The big end of the connecting rod assembly has a large cylindrical opening conforming to the shape of the journal of a crankshaft pin ("crank pin"). The large opening is provided by two separate pieces for enclosing the crank pin. The larger of the two pieces consists of the small end, the intermediate beam and a portion of the large cylindrical opening for the crank pin. The smaller of the two pieces is an end piece called the bearing cap which provides the remainder of the large cylindrical opening. The larger piece fits around one side of the crank pin. The bearing cap fits around the other side to enclose the crank pin. Bolts are used to connect the bearing cap to the larger portion of the connecting rod assembly to complete the connection of the piston to the crankshaft. Bearing inserts are used when mounting the assembly on the crank pin to allow the rod to move freely, thus the term "bearing cap."

A major design goal of the present invention is to make a cheaper, lighter connecting rod assembly without sacrificing strength and rigidity. This involves the efficient use of material without adversely affecting the performance of the connecting rod assembly. When creating a new rod, a key point about the conservation of mass is to use it economically. That is, the mass at any point should have a tight correlation to the load at that point.

It is well known to make connecting rods and their bearing caps by one of two ways: (1) forging the rod as a separate piece from the cap; or (2) forging the rod and the cap as a single piece and then separating them by cracking the cap from the rod. The first method is the traditional practice. The cap is forged in the direction of the longitudinal axis of the rod, i.e., radial to the cylindrical openings. This manufacturing method allows for a favorable cap shape from a strength and rigidity standpoint. However, weight control, dimensional stability and the number of machining steps are areas where this method may be improved.

The second method produces a connecting rod with good dimensional stability. The rod is forged in a direction normal to the longitudinal axis of the rod. One of the key benefits of this method is that no draft is needed to remove the part from the forging die. This allows for accurate weight control and provides locators for machining. The cap may be separated from the big end of the rod by fracturing the forging as is known in the art. This reduces the number of maching steps and provides unique mating surfaces on the cap and larger piece which resist lateral displacement when under load.

The rod and the cap may be made from traditional forging materials or powder metal material. Either of these materials may be used with either of the two forging processes. Powder metal has a distinct advantage over the traditional metals because a lighter weight product can be made when exactly the same design is used.

U.S. Pat. No. 2,053,962 to Lonas et al. discloses an example of the two-piece method for producing a connecting rod except that the larger piece is laminated, not forged. The shape of the bearing cap of Lonas et al. are similar to that of modem bearing caps in that there are two shoulders separated by an arcuate span conforming to a cylindrical portion of the shape of a crank pin. The outer arcuate surface of Lonas et al. have two mutually spaced circumferential ribs for purposes of reinforcement. The thickest portion of the rib is located at the center and the thinnest portion of the ribs is at the shoulders where the bolts seat.

Other connecting rods made by the two-piece method are known which have bearing cap shapes similar to that of Lonas et al. One particular design differs from the Lonas et al. design in that the area between the reinforcing ribs is filled in with material to create one thick reinforcing rib.

Still other known connecting rods made by the two-piece method have bearing caps with shapes differing from that of Lonas et al. One particular prior art design has a cap with an arcuate outer surface which is thinner at the center than at the ends.

U.S. Pat. No. 5,109,605 to Hoag et al. and U.S. Pat. No. 5,507,093 to Wittenstein et al. disclose examples of the one piece method for making connecting rods and bearing caps. In both instances, the outer arcuate surfaces of the bearing caps are not continuous. Rather, they are interrupted in the middle by a substantial rectangular lug. The bearing caps of Hoag et al. and Wittenstein et al. do not conserve as much mass as is possible.

Other examples of the one piece method for making connecting rods and bearing caps are disclosed in U.S. Pat. No. 5,536,089 to Weber et al. and U.S. Pat. No. 5,594,187 to Lynn. In these examples there are no centrally located rectangular lugs on the outer arcuate surface of the bearing cap. The arcuate spans appear to have uniform thicknesses. The bearing caps of Weber et al. and Lynn do not conserve as much mass as is possible.

SUMMARY OF THE INVENTION

The weight of the bearing cap may be reduced by treating it as a beam. One way to reduce the weight of a beam is to decrease its thickness in the middle and increase its thickness at the ends. A second way to reduce the weight of a beam is to increase its thickness in the middle and decrease its thickness at the ends. In either case, the smallest thickness will provide the weakest point of the beam. The second beam will distribute the load over two points versus the first beam which must carry the entire load at one point. Therefore, the smallest thickness of the second beam may be smaller than that of the first beam and the mass of the second beam will be less.

Any bearing cap has two important areas that must be considered during its design. The most important of these two areas is the section which lies along the longitudinal symmetrical axis of the connecting rod. This section of the cap experiences the maximum load imparted on the cap. This load dictates the minimum thickness that the cap may have at this location. The thickness of this section combined with the shape of the cap (e.g., circular, polygonal, oval, or combinations thereof) will dictate the thickness of the cap at the other points along the cap.

The other important thickness is located at the shoulders of the bearing cap where the bolts seat. If this area of the shoulder is machined, it may have surface irregularities caused by the machining process. In order to accurately predict any failure of the bearing cap, the smallest thickness of the cap must be known. If the smallest thickness is on a machined surface, its value cannot by predicted accurately due to the potential machining irregularities. Extra material must be placed at this location to insure against failure caused by machining irregularities. Further, the junction between the forged and machined surfaces should not be a sharp intersection. Sharp points allow stresses to concentrate at the point. Thus, the transition from the forged surface to the machined surface should be formed by a fillet, i.e., a concave junction, which will avoid this stress concentration.

If the smallest cross sectional thickness is located between the longitudinal axis of symmetry and the machined surface then a minimum weight can be achieved. Locating the minimum thickness away from any machined surface nullifies the effect of surface irregularities caused by the machining process.

Still, another important consideration in reducing the weight of the cap is to maintain a tight correlation between mass and load at any point of the arcuate span under consideration. Thus, an arc of a circle should be used for the shape of the outer arcuate surface. A complex curved surface which has variable radii, e.g., a parabola, does not have a tight correlation because there will be non-load bearing mass. To insure that a maximum thickness occurs at about the longitudinal axis of symmetry and a minimum thickness occurs between the longitudinal axis of symmetry and the machined surface on the shoulder while at the same time maintaining a tight correlation between mass and load, the radius of the outer arcuate span should have its center point displaced from the center point of the radius of the inner arcuate surface in a direction towards the bearing cap. This will place the minimum thickness between the longitudinal axis of symmetry and the machined surface while maintaining a tight correlation between mass and load.

The connecting rod of the invention has a small end, a big end and a beam connecting the ends. The big end has a circular opening and a bearing cap. The bearing cap has shoulders on either side, each having a machined surface. The circular opening has a first radius, $R_I$. The bearing cap has an arcuate outer surface which has a second radius, $R_O$. The centerpoints of the respective radii are positioned along the longitudinal axis of the beam and spaced from each other. The bearing cap has a first cross-sectional thickness, A, measured along the longitudinal axis of symmetry. A second cross-sectional thickness, B, is measured in a region between the longitudinal axis of symmetry and one of the shoulders. There is a third thickness, C, which is measured at the smallest cross-sectional thickness of the machined surface. The relationship between the thicknesses is such that A>B and C>B.

In more refined aspects: the relationship between the radii is such that $R_O = R_I$ or $R_O > R_I$; thickness A>C; the outer surface of the bearing cap may be such that it has a machined surface and a forged surface and, in such a case, C is measured on the machined surface and A and B are measured on the forged surface; the arcuate outer surface may be continuously arcuate in the area between the shoulders in that there are no interruptions such as a lug or a circumferential reinforcing rib.

The bearing cap may vary such that a first cross-sectional thickness, $B_1$, is the smallest thickness on the bearing cap and $B_1$ is measured in a region between the long symmetrical axis of the rod and one of the shoulders. In this arrangement a second thickness, $C_1$, is measured at the smallest cross-sectional thickness of the machined surface. In such a case, $B_1$ is not located at $C_1$.

In another aspect, a connecting rod includes a longitudinally extending rod having a first end, a second end and a beam connecting the ends. The second end has a circular opening with a first radius for receiving bearing inserts and a journal of a crankshaft pin. The second end further includes a bearing cap partially enclosing the circular opening with an arcuate inner surface. The bearing cap has an outer surface with shoulders. Each shoulder is provided with a machined surface for seating a bolt. The shoulders are mutually spaced by an outer arcuate surface having a second radius. The first and second radii have center points which are mutually spaced longitudinally. The bearing cap has thicknesses $A_2$, $B_2$ and $C_2$ extending between the bearing cap's outer surface and arcuate inner surface. Thickness $A_2$ is located at about the center of the outer surface. Thickness $B_2$ is located between $A_2$ and a shoulder. Thickness $C_2$ is located at a minimum distance between the machined surface and the inner arcuate surface. Thickness $A_2$ is greater than thickness $B_2$, and thickness $C_2$ is greater than thickness $B_2$.

In yet another aspect, a bearing cap for a connecting rod is forged integrally with the connecting rod from a powder metal sintered preform and then separated from the connecting rod by rod cracking. There is an inner arcuate surface forming a portion of a cylindrical bore for receiving a bearing insert and the journal of a crankshaft pin. There is an outer surface having two shoulders mutually spaced by a continuous outer arcuate surface. The shoulders receive bolts for connecting the bearing cap to the connecting rod. The bearing cap has varying thicknesses. A thickness about a midpoint of the outer arcuate surface is greater than a thickness about an end of the outer arcuate surface. A minimum thickness between the shoulders and the inner arcuate surface is greater than the thickness about the end of the outer arcuate surface.

DETAILED DESCRIPTION OF THE PREFERRED EMBODIMENTS OF THE PRESENT INVENTION

Figure 1:
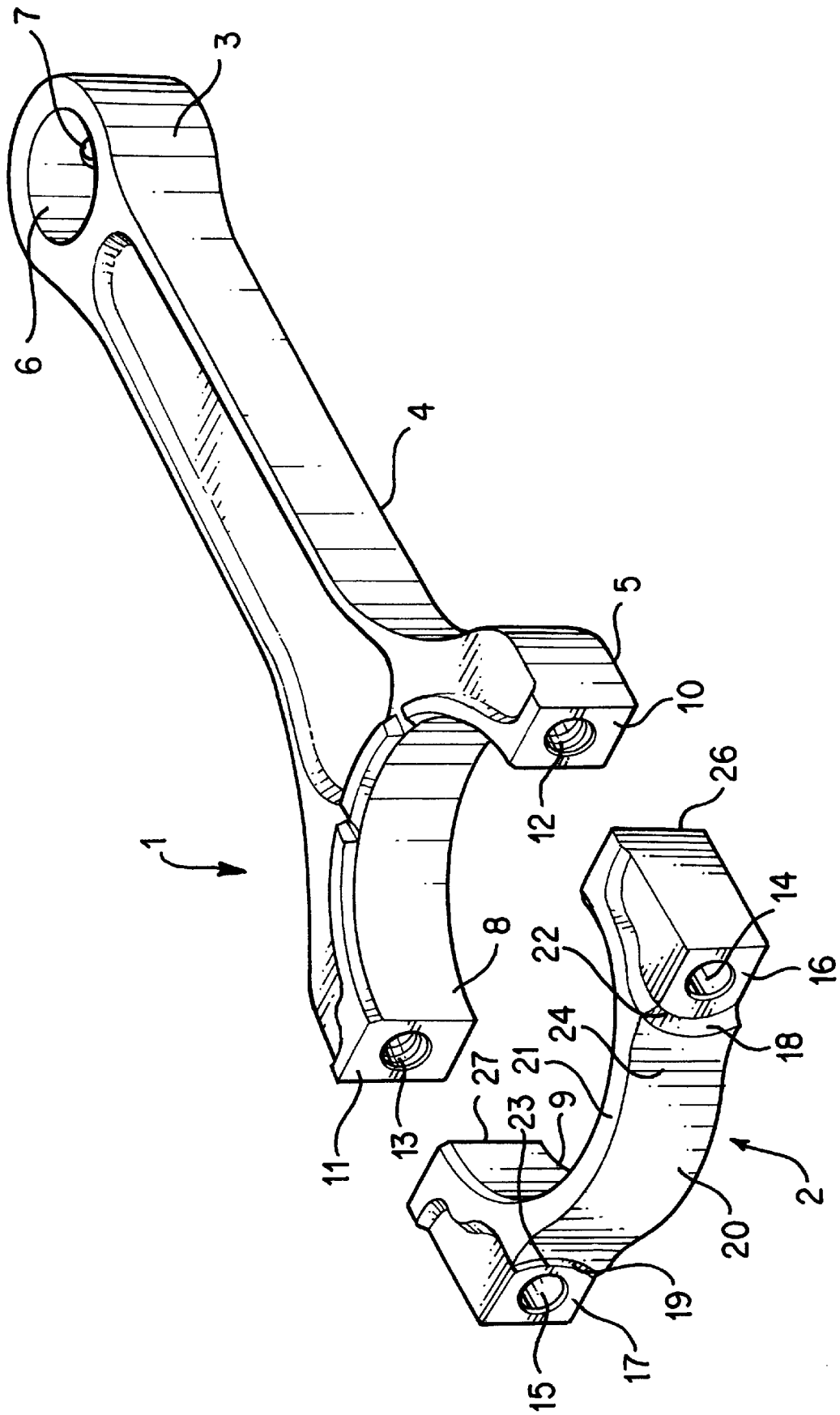
FIG. 1 is an elevated perspective of the preferred embodiment showing the connecting rod assembly without the bolts.

The connecting rod assembly is shown in perspective in FIG. 1. For purposes of this description, the assembly is shown without the bolts which are inserted through bores 12, 13, 14 and 15. Such bolts and other mechanical fasteners are known in the art. Thus, a description is not deemed necessary for purposes of the specification. The connecting rod assembly consists of two pieces 1, 2. For purposes of this description the larger piece 1 is referred to as the connecting rod or rod and the smaller piece 2 is referred to as the bearing cap or cap. The larger piece 1 consists of a small end 3, a beam portion 4 and a large end 5 which provides a portion of the opening in the large end 8.

The bearing cap 2 provides the remainder 9 of the enclosure 37 (shown in FIG. 2) which is the cylindrical opening for enclosing the journal of a crankshaft. While the wrist pin of a piston may be inserted in the enclosed small bore 6, the complicated structure of a crankshaft prohibits such an insertion in the large end 5. Thus, the bearing cap 2 is used to capture the crank pin between the bearing cap and the connecting rod 1. The crank pin enclosure 37 is maintained with bolts extending through the shoulder bores 12, 13, 14, and 15.

The outer surface of the bearing cap which is also the bottom end of the connecting rod assembly 1, 2 has an uninterrupted arcuate outer surface 20 with shoulders 16 and 17 on either side of the surface 20. The areas of the shoulders where the bolts are seated, 16, 17 are machined surfaces and are recessed into the shoulder. Steps 18, 19 are machined and delineate the machined surfaces 16, 17 from the non-machined/forged portions of the shoulder. These steps 18, 19 have a riser and may be in the form of a chamfer or a bevel. The non-machined/forged area of the shoulders are shown more clearly on FIGS. 2 and 3 as surfaces 46 and 47. It should be noted that the surface between the chamfers is an "as-forged" surface.

The connecting rod assembly 1, 2 is preferably forged as one piece. The preferred forging process is of the forged powder metal sintered preform type which is known in the art and is disclosed, for example, in U.S. Pat. No. 5,109,605 to Hoag et al. which is incorporated herein by reference.

The powder metal sintered preform process provides a lightweight connecting rod. Forging occurs in the direction shown in FIG. 3 which is axial to the crank pin opening 37 shown in FIG. 2. The axial direction of forging is shown by arrow/line 28—28.

The axial direction of forging has its limits in terms of the ability to provide complex features on the bottom end 20. Thus, it is preferred that surface 20 be free of all complicated structure such as circumferential ribbing and that the bottom end 20 be uniformly arcuate along the entire axis 28 of the cylindrical bore 37. It should be noted that when forging in the axial direction the smooth end surface 20 is easily attainable by and will not prematurely wear conventional powder metal forging tooling.

Figure 2:
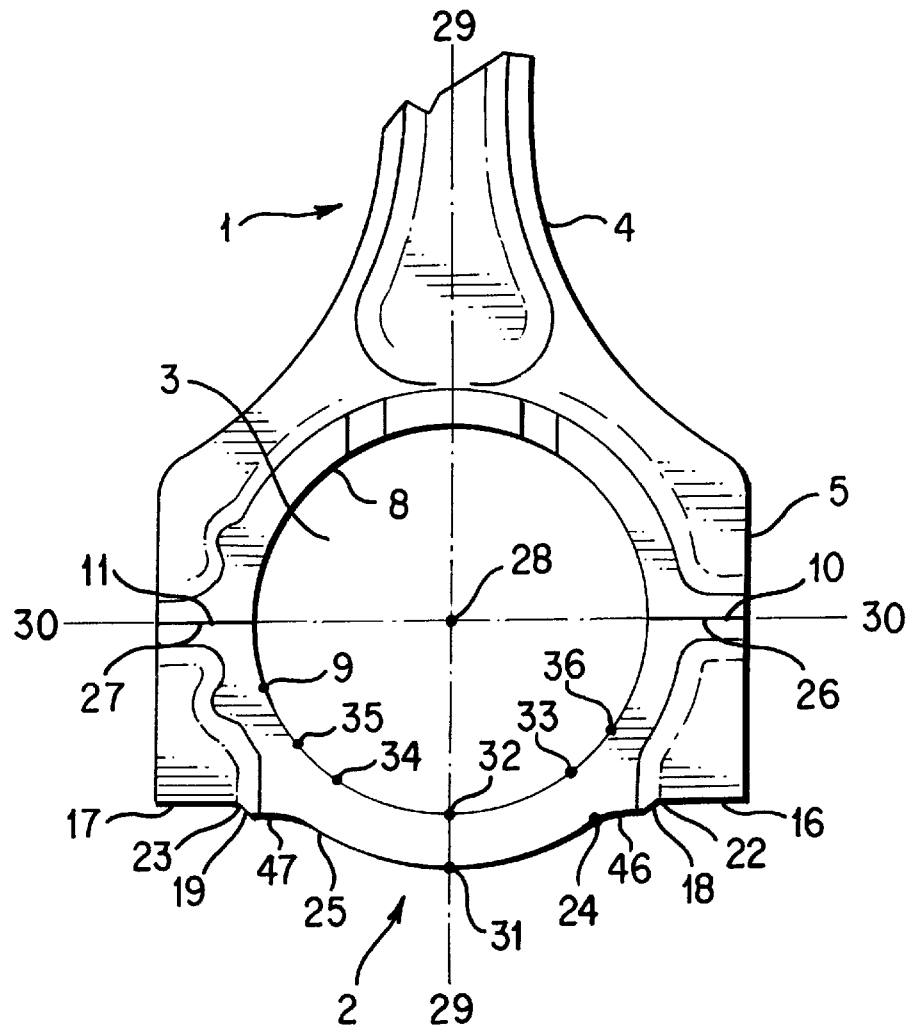
FIG. 2 is a front plan view of the lower portion of the connecting rod assembly of FIG. 1 showing the bearing cap mated to the rod to provide crank pin enclosure.

With reference to FIG. 2, the rod cracking procedure referred to above separates connecting rod 1 from bearing cap 2 along the diameter line 30—30. As discussed above, the resulting mating surfaces 10, 11, 26 and 27 are irregular, mate securely, are unique and resist lateral displacement of the bearing cap 2 from the rod 1.

With continuing reference to FIG. 2, mass is conserved while retaining strength and rigidity in the bearing cap 2 by maximizing thickness between points 31 and 32 and minimizing thickness between points 24 and 33 and between points 25 and 34. In general, failure of the bearing cap while under load can be expected to occur at the thinnest portion of the bearing cap. Thus, offsetting the thinnest portion of the bearing cap to the sides of the center of the thrust face 32 where the maximum load occurs, improves the over all rigidity of the cap 2.

The outer surface of the bearing cap has an arcuate surface 24, 31 and 25. The shoulders are located to either side of the arcuate surface. The right shoulder of FIG. 2 consist of forged surface 46, chamfer 18, corner 22 between the chamfer 18 and machined surface 16 and the machine surface 16. Connecting rod assembly 1, 2 is symmetrical along longitudinal line 29—29, also known as the longitudinal axis of symmetry or the long symmetrical axis of the beam. Thus, the left shoulder consists of forged surface 47, chamfer 19, the corner 23 between the chamfer and the machine surface 17, and the machined surface 17.

The machined surfaces of the shoulders 16 and 17 are shown recessed into the shoulders 46 and 47. The machining of the surfaces assures proper seating of the bolts. The delineation between the forged surfaces 46 and 47 and the machined surfaces 16 and 17 are the machined chamfers 18 and 19.

In general, when reducing and conserving mass in the context of mixed forged and machined surfaces, the thinnest portion of the bearing cap should not be located at the machined surfaces. All thicknesses being equal, failure of the bearing cap can be expected to occur at the weakened machined surfaces due to the irregularities in the substrate which result from machining. Thus, the thickness of the bearing cap between the chamfer corners 22, 23 and inside surface points 36 and 35 should be greater than the thinnest points of the bearing cap so as to control and predict failure of the bearing cap at some other location.

The outer curved span of the bearing cap between points 24 and 25 wherein the middle portion is thicker than the end portions 24 and 25 is a strong structure where load is evenly distributed from the thick most center portion 31 to the ends of the arc span at 24 and 25.

Figure 4:
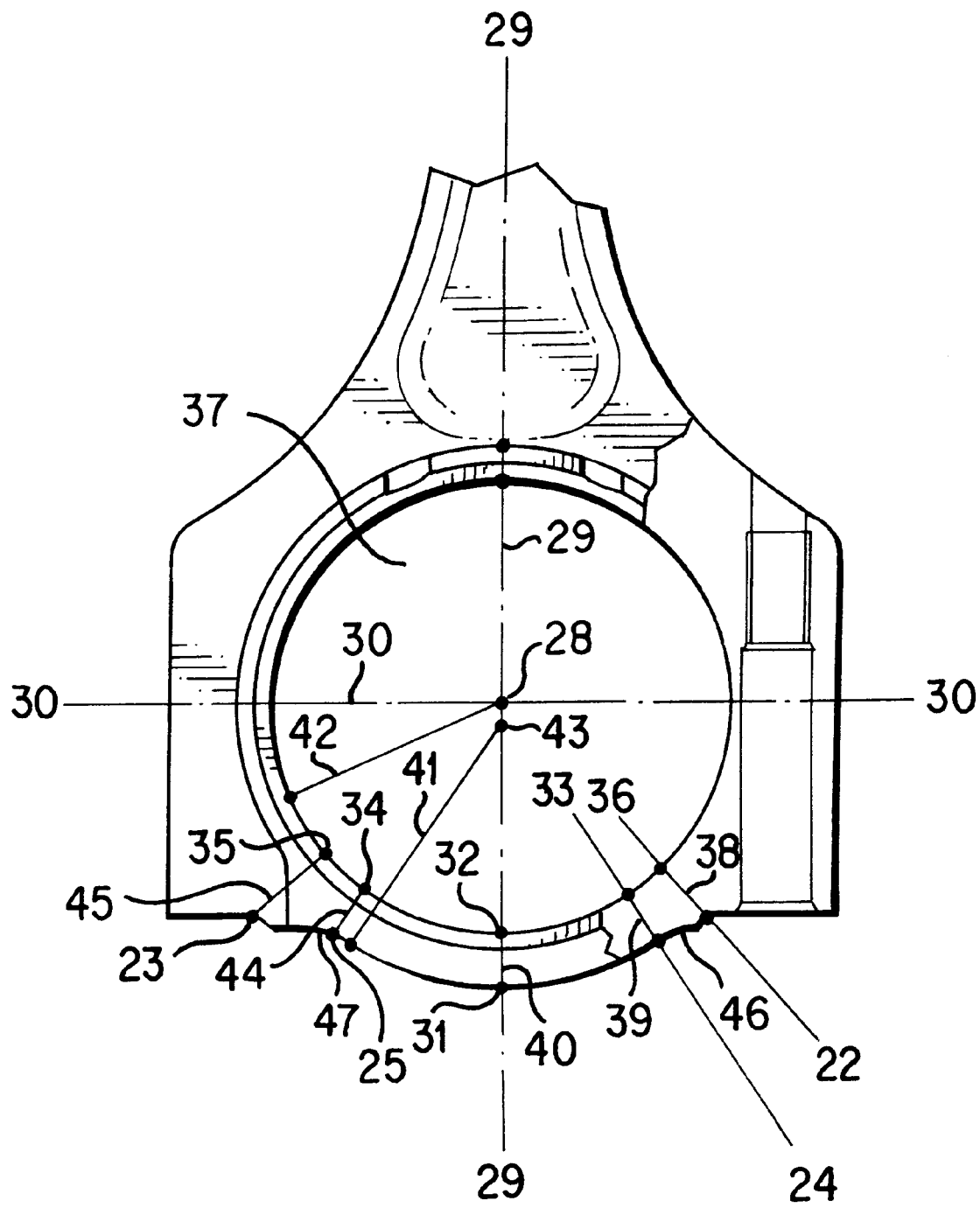
FIG. 4 is another front plan view in partial cutaway of FIG. 2.

Referring to FIG. 4, the preferred mode of practicing the invention is shown with some of the geometric relationships. The right side of the drawing is shown in partial cutaway. It is preferred that the outer arc defined by points 24, 31, and 25 be the arc of a circle having a radius ($R_O$) 41. The radius ($R_O$) 41 has a center point 43 located along the long symmetrical axis 29—29. Further, it is preferred that the inner arcuate surface of the large cylindrical opening 37 defined by points 33, 32 and 34 be the arc of a circle having a radius ($R_I$) 42 with center point 28. The outer arc, 24, 31, 25 is preferably nonconcentric to the inner arc 33, 32, and 34, i.e., the arcs have different center points. The respective center points 43 and 28 should be spaced from one another along line 29—29. Preferably, the center point of the outer arc 43 is displaced towards point 31 at the bottom end of the connecting rod. Circular arcs are preferred over more complex arcuate surfaces such as parabolas and the like because circular arcs minimize the amount of non-load bearing mass. The radius ($R_O$) 41 may be less than, equal to or greater than the radius ($R_I$) 42.

Figure 3:
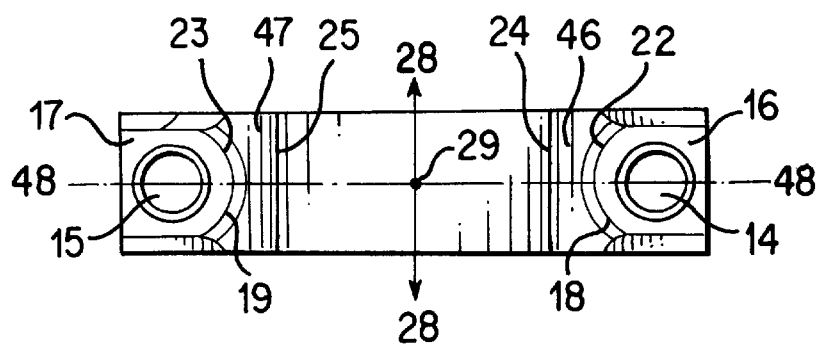
FIG. 3 is a bottom plan view of the connecting rod assembly shown in FIG. 2.

From the viewpoint of FIG. 4, it can be seen that the various thicknesses of the bearing cap can be maximized and minimized as follows. Assuming the absence of a cutaway on FIG. 4, thicknesses 38 and 45 (designated variously as C, $C_1$, $C_2$) should be greater than thicknesses 39 and 44 (designated variously as B, $B_1$, $B_2$). Further, the thickness at 40 (designated variously as A, $A_1$, $A_2$) should be greater than the thicknesses at 39 and 44. (Because of the cutaway section on FIG. 4, the thickness 45 as shown is actually greater than the thickness 38. Referring to FIG. 3, thickness 38 is measured where chamfer 18 intersects centerline 48.

Thickness 45 is measured where chamfer 19 approaches the top of the cap. That is to say, the radial distance from the chamfer 18 to the surface of the enclosure 37 decreases from the top of the cap to the centerline 48.)

Figure 5:
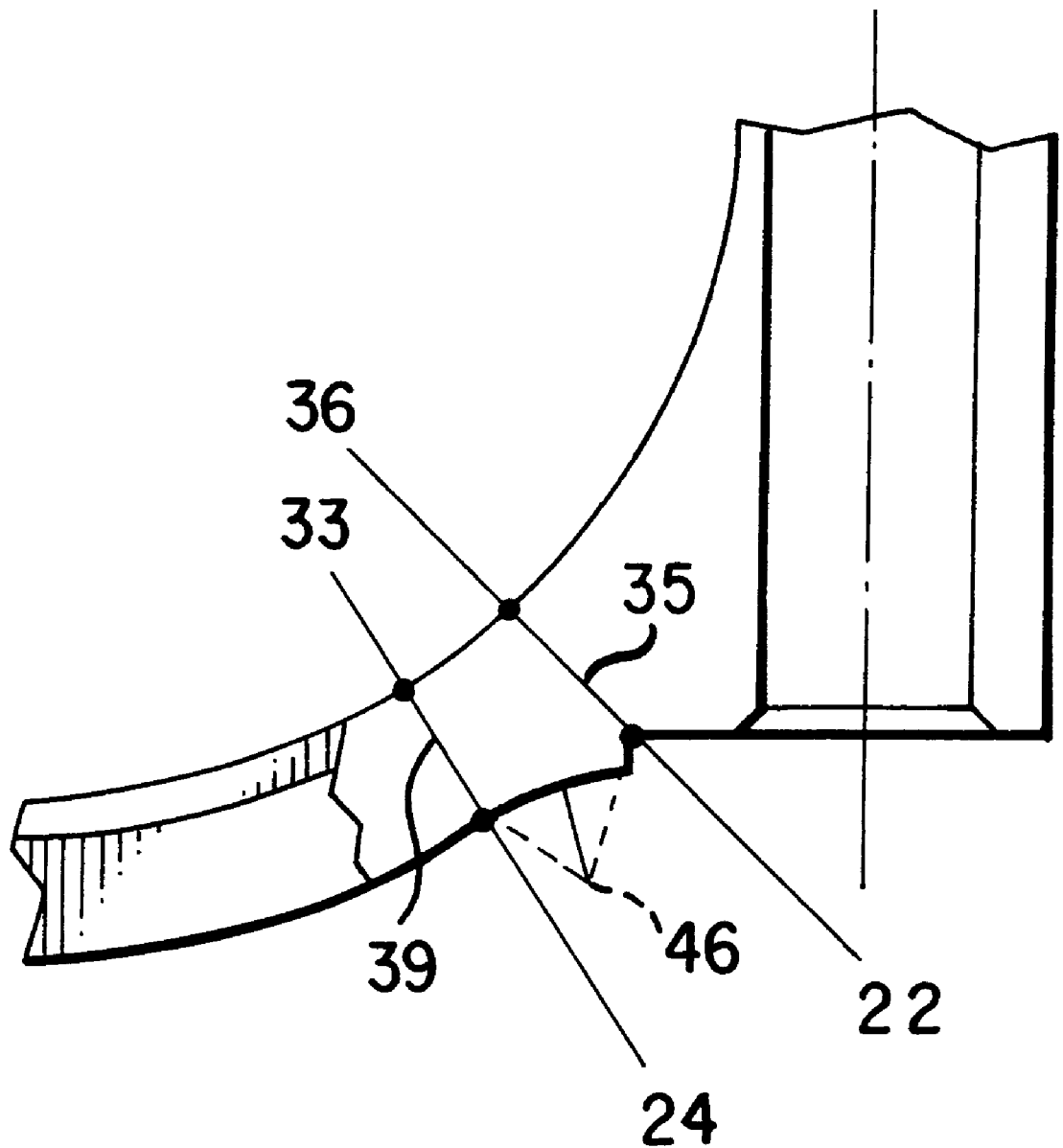
FIG. 5 is an enlargement of the lower right quadrant of FIG. 4.

FIG. 5 illustrates an important juncture. The transition from the end of the arcuate outer surface 24 to the shoulder is formed by fillet 46 which avoids a sharp point at this intersection. Sharp points allow stresses to concentrate at the point. Thus, the fillet avoids stress concentration. The minimum thickness 39 is located at the junction of the curved outer surface of the cap and fillet 46.

The actual dimensions of connecting rods vary greatly over a vast spectrum. Materials, methods of production, stroke length, maximum engine speed, etc. and other variables known to those in the art all bear on the dimensionality of a specific connecting rod. As such, the invention does not reside in any specific dimensions. Those skilled in the art will know from this disclosure how to utilize material more efficiently when designing a specific connecting rod for a specific application.

The present invention conserves mass by ensuring that the outer arc has its radial center point displaced from that of the inner arc. Failure of the bearing cap at the machined surfaces is avoided by ensuring that the thinnest portions of the bearing cap occur at the ends of the outer arc shown at areas 24, 25 of FIG. 3. Thus, a bearing cap is provided which conserves mass, controls and locates probable failure at forged surfaces and avoids failure at machined surfaces while maintaining strength and rigidity.

It should be noted that the above description is for purposes of illustration only and further deviations can occur while retaining the essence and spirit of the invention, the scope of which is set out in the following claims.

What is claimed is:

1. A connecting rod, comprising: a small end, a big end and a beam connecting the ends, wherein the big end has a circular opening and a bearing cap, wherein the bearing cap has shoulders with a machined surface, wherein the circular opening has a first radius, $R_I$, wherein the bearing cap has an arcuate outer surface, wherein the arcuate outer surface has a second radius, $R_O$, wherein the centers of the opening and the arcuate outer surface are positioned along the long symmetrical axis of the beam and spaced from each other, wherein the bearing cap has a first cross-section thickness, A, measured along the long symmetrical axis of the rod, a second cross-sectional thickness, B, measured in a region between the long symmetrical axis of the rod and one of the shoulders, and a third thickness, C, is measured at the smallest cross-sectional thickness of the machined surface, wherein A>B and C>B.

2. The connecting rod of claim 1 wherein $R_O$>$R_I$.

3. The connecting rod of claim 1 wherein A>C.

4. The connecting rod of claim 1 wherein the outer surface has a machined surface and a forged surface, and further wherein C is measured on the machined surface and A and B are measured on the forged surface.

5. The connecting rod of claim 1 wherein the arcuate outer surface is continuously arcuate.

6. A connecting rod, comprising: a small end, a big end and a beam connecting the ends, wherein the big end has a circular opening and a bearing cap, wherein the bearing cap has shoulders with a machined surface, wherein the circular opening has a first radius, $R_I$, wherein the bearing cap has an arcuate outer surface, wherein the arcuate outer surface has a second radius, $R_O$, wherein the centers of the opening and the arcuate outer surface are positioned along the long symmetrical axis of the beam and spaced from each other, wherein the bearing cap has a first cross-sectional thickness, $B_1$, where $B_1$ is the smallest thickness on the bearing cap and $B_1$ is measured in a region between the long symmetrical axis of the rod and one of the shoulders, and a second thickness, $C_1$, is measured at the smallest cross-sectional thickness of the machined surface, wherein $B_1$ is not located at $C_1$.

7. The connecting rod of claim 6 wherein $R_O$>$R_I$.

8. The connecting rod of claim 6 wherein a largest cross-sectional thickness, $A_1$, occurs in a central portion of the arcuate outer span.

9. The connecting rod of claim 6 wherein the outer surface has a machined surface and a forged surface, and further wherein $C_1$ is located on the machined surface and $A_1$ and $B_1$ are located on the forged surface.

10. A connecting rod assembly, comprising:
a longitudinally extending rod having a first end, a second end and a beam connecting the ends, wherein the second end has a circular opening with a first radius for receiving bearing inserts and a journal of a crankshaft pin;
the second end further comprising a bearing cap partially enclosing the circular opening with an arcuate inner surface, said bearing cap further comprising an outer surface having two shoulders wherein each shoulder is provided with a machined surface for seating a fastener, wherein the shoulders are mutually spaced by an arcuate outer surface having a second radius, and further wherein the first and second radii have center points which are mutually spaced longitudinally;
the bearing cap further comprising thicknesses $A_2$, $B_2$ and $C_2$ extending between the bearing cap's outer surface and arcuate inner surface, wherein thickness $A_2$ is located at about the center of the outer surface, wherein thickness $B_2$ is located between $A_2$ and the shoulders, wherein thickness $C_2$ is located at a minimum distance between the machined surface and the inner arcuate surface, wherein thickness $A_2$ is greater than thickness $B_2$ and wherein thickness $C_2$ is greater than thickness $B_2$.

11. The connecting rod of claim 10 wherein the first radius is equal in length to the second radius.

12. The connecting rod of claim 10 wherein the second radius is greater in length than the first radius.

13. The connecting rod of claim 11 wherein $A_2$>$C_2$.

14. The connecting rod of claim 12 wherein $A_2$>$C_2$.

15. The connecting rod of claim 13 wherein the arcuate outer surface is a forged surface and thicknesses $A_2$ and $B_2$ are located at the forged surface.

16. The connecting rod of claim 14 wherein the arcuate outer surface is a forged surface and thicknesses $A_2$ and $B_2$ are located at the forged surface.

17. A bearing cap for a connecting rod which has been forged integrally with the connecting rod from a powder metal sintered preform and then separated from the connecting rod by rod cracking, comprising:
an inner arcuate surface forming a portion of a cylindrical bore for receiving a bearing insert and the journal of a crankshaft pin;
an outer surface comprising two shoulders mutually spaced by a continuous outer arcuate surface, said shoulders adapted to receive fasteners for connecting the bearing cap to the connecting rod;
said bearing cap further comprising varying thicknesses, wherein a thickness about a midpoint of the outer arcuate surface is greater than a thickness about an end of the outer arcuate surface and, wherein a minimum thickness between the shoulders and the inner arcuate surface is greater than said thickness about the end of the outer arcuate surface; and said bearing cap further comprising a machined surface on each shoulder for accurate seating of a fastener, wherein said minimum thickness between the shoulders and the inner arcuate surface is the minimum thickness between the machined surface of the shoulder and the inner arcuate surface.

18. The bearing cap of claim 17 wherein the inner and outer arcuate surfaces are arcs of non-concentric circles.

19. The bearing cap of claim 18 having a long symmetrical axis extending parallel to the shoulders and bisecting the inner and outer arcs, wherein the respective radii of the inner and outer arcs have center points located on said axis.

20. The bearing cap of claim 19 wherein the radius of the outer arc is greater than the radius of the inner arc.

21. The bearing cap of claim 20 wherein the radius of the outer arc is less than the radius of the inner arc.

22. The bearing cap of claim 21 wherein the radius of the outer arc is equal to the radius of the inner arc.

23. The bearing cap of claim 22 wherein the machined surface is recessed into the shoulder with a portion of non-machined shoulder surface located between the machined surface and the end of the outer arc, said shoulder further comprising a chamfer between the machined and non-machined surfaces of the shoulder, and wherein the minimum thickness between the machined surface of the shoulder and the inner arc is located at a corner formed by the machined surface and the chamfer.

24. The bearing cap of claim 23 wherein the thickness about the midpoint of the outer arc is greater than the minimum thickness at a corner formed by the machined surface and the chamfer.

* * * * *